United States Patent [19]

Geren et al.

[11] Patent Number: 4,991,144

[45] Date of Patent: Feb. 5, 1991

[54] DOPPLERIZED ECHO REPEATER

[75] Inventors: Keith E. Geren; Ray M. Marklnd, both of San Diego, Calif.

[73] Assignee: The United States of America as represented by the Secretary of the Navy, Washington, D.C.

[21] Appl. No.: 269,211

[22] Filed: Mar. 29, 1963

[51] Int. Cl.$^5$ ............................................. H04K 3/00
[52] U.S. Cl. ......................................................... 367/1
[58] Field of Search ................ 340/3 E, 5 D, 2; 343/17.7, 7.5, 18; 325/9–11, 4; 35/10.4; 367/1; 434/6, 8

[56] References Cited

U.S. PATENT DOCUMENTS

| 2,228,815 | 1/1941 | Deerhake | 455/22 |
| 2,882,394 | 4/1959 | Mortley | 455/22 |
| 2,935,701 | 5/1960 | Robinson et al. | 342/171 |
| 2,975,396 | 3/1961 | Mueller | 367/1 |
| 2,977,568 | 3/1961 | Rashon, Jr. | 367/102 |
| 3,164,659 | 1/1965 | Abrams | 434/6 |

OTHER PUBLICATIONS

Albers, Underwater Acoustics Handbook, 1960, pp. 221-223.

Primary Examiner—Thomas H. Tarcza
Assistant Examiner—Daniel T. Pihulic
Attorney, Agent, or Firm—Sol Sheinbein; Harvey David

[57] ABSTRACT

The present invention relates generally to submarine simulating decoy and in particular is a sonar system for receiving the acoustical search pulse from an enemy or other vehicle and converting it into a dopplerized sonar signal which is then broadcast back to the enemy vessel for deception and tactical combat purposes.

3 Claims, 5 Drawing Sheets

DOPPLERIZED ECHO REPEATER

The invention described herein may be manufactured and used by or for the Government of the United States of America for governmental purposes without the payment of any royalties thereon or therefor.

The present invention relates generally to submarine boat simulating decoys and in particular is a sonar system for receiving the acoustical search pulse from an enemy or other vehicle and converting it into a dopplerized sonar signal which is then broadcast back to said enemy vessel for deception and tactical combat purposes.

In order to facilitate deception of an enemy during underwater warfare, it is often desirable and sometimes necessary to employ submarine vehicles that simulate the characteristics of actual submarine boats, because so doing not only substitutes lesser expensive and more portable devices for a real submarine that may be needed for other more important tasks but also makes use of a more expendable device as a decoy means, thus saving or considerably increasing the probabilities of saving human lives and more valuable property.

For similar reasons, use of devices such as the subject invention also facilitate to considerable extent the training of sonar operators without placing either the lives of said sonar operators or actual submarine boats in jeopardy or preventing the use of said submarine boats for more important purposes.

The devices of the prior art, while being useful for many suitable purposes, do not appear to have sufficient sophistication to provide operational flexibility needed for most practical combat maneuvers or undersea warfare operations. In the past, for example, devices that employed lithium hydride which reacted with seawater were used to generate a cloud of hydrogen bubbles from which sonar echoes could be obtained by any one echo searching thereon, including an enemy submarine or surface vessel. However, such devices were inherently weak in their decoying effectiveness due to the fact that they presented false targets which did not incorporate doppler in the eches therefrom and, furthermore, such echoes usually had a somewhat mushy character which prevented them from sounding like the echo returns from an actual solid target such as an actual submarine boat or the like. In addition, the usefulness thereof was severely limited due to the fact that the intensity of the echoes therefrom faded noticeably after a few minutes, thereby considerably reducing target strength.

The echo repeater constituting the instant invention is a considerable improvement over the prior art devices in that it not only provides the proper strength of echo signal to effectively simulate an actual submarine boat, it also incorporates artificial doppler therein, which gives the appearance to any enemy echo-searcher that the decoy is traveling or possibly attacking the enemy-search vessel. Hence, it not only appears to be a more realistic submarine target, but it also is of some tactical significance in view of the fact that it definitely becomes an object to be reckoned with from a defensive standpoint by enemy vessels involved in combat maneuvers. In other words, this invention provides a means that is capable of appearing to be a real submarine boat that is tactically deployed for combat to sophisticated sonar equipment and expert sonar operators either for training or target decoy purposes.

It is, therefore, an object of this invention to provide an improved submarine decoy.

Another object of this invention is to provide a stationary decoy which gives the impression of being an actual moving submarine boat.

Another object of this invention is to provide an improved broadband dopplerized echo repeater.

Still another object of this invention is to provide a method and means of diverting enemy attention sufficiently during combat operations or luring him to a position of vulnerability so that a successful attack thereon may be made.

A further object of this invention is to provide a double heterodyning technique which permits the frequency of an output signal to be displaced from the frequency of a predetermined input signal by an amount equal to the difference frequencies of two predetermined crystal oscillators.

A further objective of this invention is to provide a dopplerized echo repeater which effectively simulates a moving submarine echo at bow, stern, or quarter aspect.

A further object of this invention is to provide an unmanned training device for effectively and economically training sonar operators.

Another object of this invention is to provide a submarine decoy means that will satisfactorily act as a target for active acoustic homing torpedoes or missile type weapons.

Another object of this invention is to provide an expandable dopplerized echo repeater which is easily and economically manufactured and maintained.

Other objects and many of the attendant advantages of this invention will be readily appreciated as the same becomes better understood by reference to the following detailed description when considered in conjunction with the accompanying drawings in which like reference numerals designate like elements throughout the figures thereof and wherein.

Figure 1:
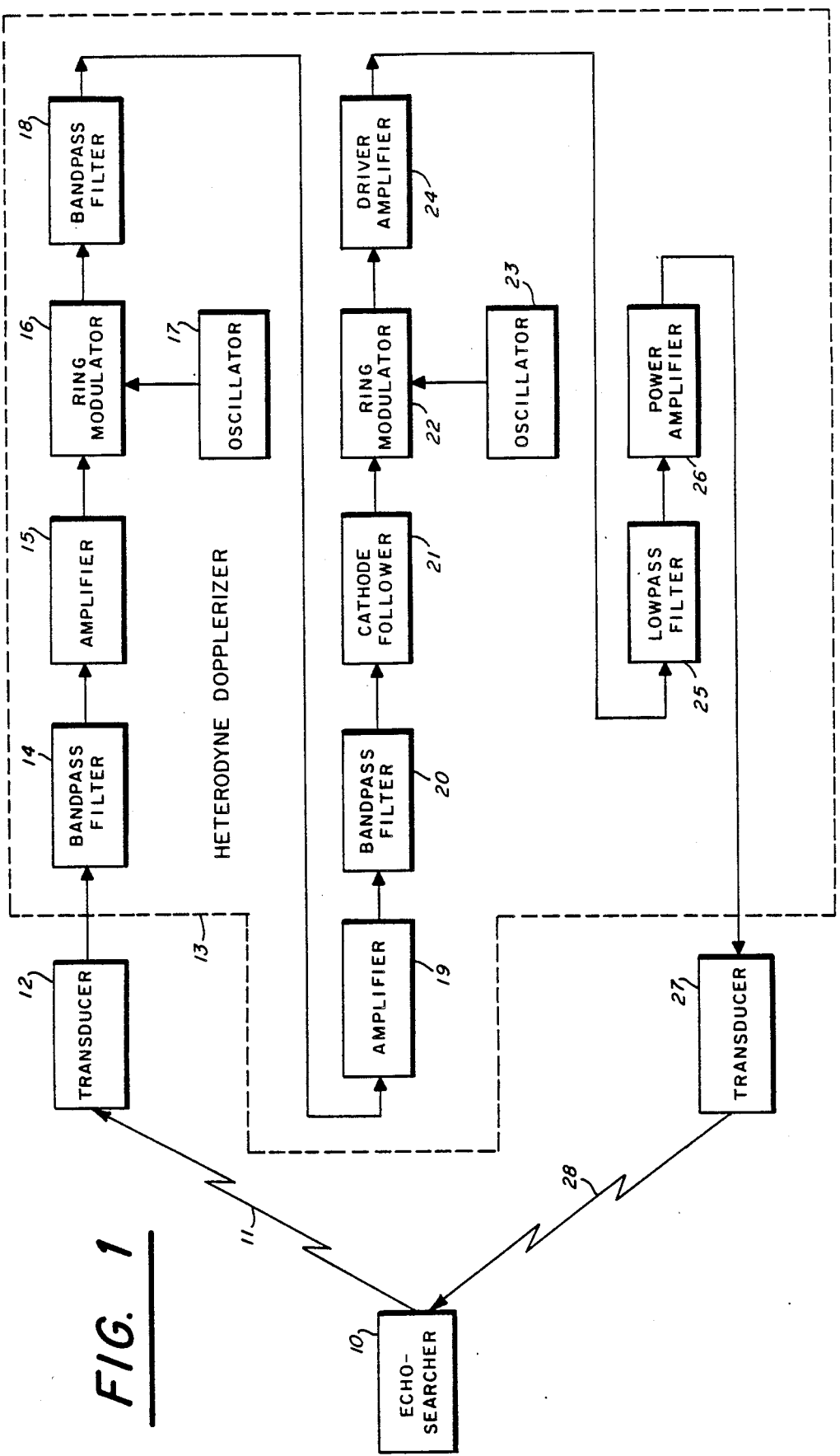
FIG. 1 is a block diagram representation of the electronic components of the subject invention.

Referring now to FIG. 1, there is shown an echo searcher 10 which, for example, represents any enemy vessel that is searching for underwater targets with its sonar system. It could be a submerged submarine boat, a surface vessel, or any other device capable of echo-ranging or echo-searching sonar operations. Of course, the echo-search signal broadcast thereby emanates in substantially all directions in anticipation of picking up submerged targets. Such an echo searching signal emanating from echo searcher 10 is a transmitted sonar signal 11 which impinges upon a transducer 12 that is adapted for receiving same. Said transducer 12 is preferably a hydrophone which is capable of receiving acoustical signals within a broad frequency band and converting them into proportional electrical signals. Such electrical signals obviously constitute the output of transducer 12, and they are applied to the input of a heterodyne dopplerizer 13, with the actual input portion thereof being a band-pass filter 14 having a 10 to 50 kilocycle per second pass-band, The output thereof is fed through an amplifier 15 to one of the inputs of a ring modulator 16. The other input of ring modulator 16 is supplied by an oscillator 17 operating, for instance, at a frequency of 185,060 cycles per second. Ring modulator 16, of course, not only acts as a preferred mixer but also operates as a limiter and the limit level thereof may be established by the amplitude of the aforesaid oscillator output signal. The output of ring modulator 16 is fed through a 195 to 235 kilocycle per second band-pass filter 18, an amplifier 19, a 195 to 235 kilocycle per second band-pass filter 20, and a circuit isolation cathode follower 21, to one of the inputs of another ring modulator 22. Like the aforementioned ring modulator 16, ring modulator 22 acts as a mixer which permits the first oscillator signal and harmonics of the input signal to be more nearly balanced out, as well as being an unusual and excellent limiter, the limit of which may be established by its respective oscillator amplitude to provide an output signal therefrom which has a reasonably good waveform. A 185 kilocycle per second oscillator 23 is, of course, coupled to the other input of ring modulator 22. The output of ring modulator 22 is coupled through a driver amplifier 24, a low pass filter 25 which, for example, passes from 10 to 50 kilocycles per second, to a power amplifier 26. The output of amplifier 26 is coupled to a projector transducer 27 of the type, for instance, which converts an electrical signal into a proportional acoustical signal 28 that is broadcast back to the original echo-searcher 10.

As can readily be seen, elements 14 through 26 are so combined as to constitute the aforementioned heterodyne dopplerizer portion of the subject invention.

Figure 3:
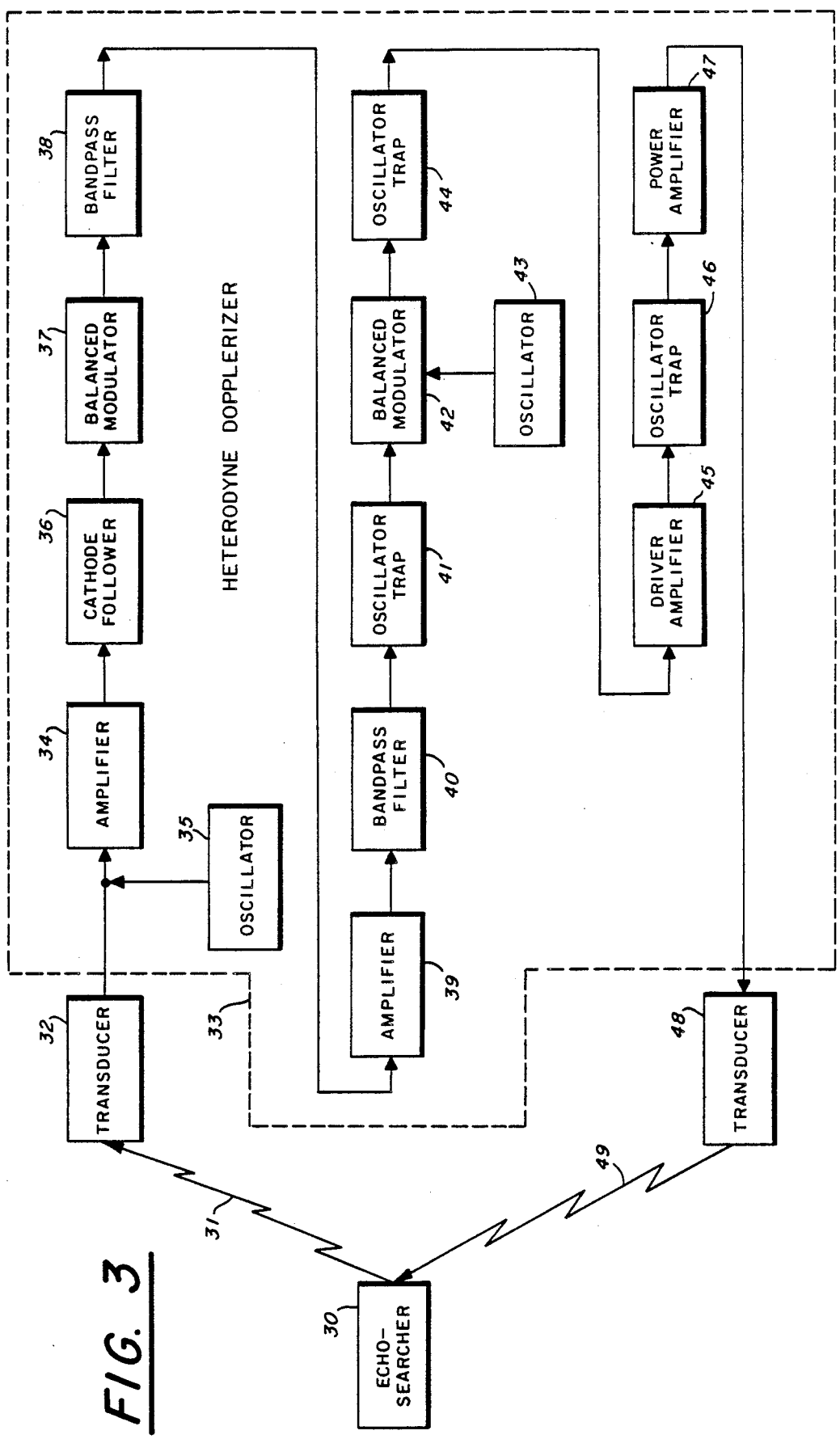
FIG. 3 is a block diagram representation of another embodiment of the subject invention.

The device of FIG. 3 is with only a few exceptions quite similar to the device illustrated in FIG. 1 and is, thus, considered to be another of the preferred exemplary embodiments of species of the subject invention.

Referring now to FIG. 3 there is shown an echo-searcher 30 which may be, for example, an enemy submarine boat, surface vessel, torpedo, or other combat missile type of device which is echo ranging upon all targets in the vicinity thereof by means of its sonar system. Echo-searcher 30, thus, broadcasts an acoustical energy signal throughout a predetermined underwater area which is received by a hydrophone type of electro-acoustical transducer 32 of the invention. The output of transducer 32 is then coupled to a heterodyne dopplerizer portion 33 of the invention and, in particular, is coupled to the input of an amplifier 34. In addition, 250.1 kilocycle per second oscillator 35 has its output likewise coupled to said input of amplifier 34. The output of amplifier 34 is coupled through a circuit isolation cathode follower 36 to a balanced modulator 37, the output of which is passed through a 300 to 350 kilocycle per second band-pass filter 38. Then the output of band-pass filter 38 is fed through an amplifier 39, another 300 to 350 kilocycle per second band-pass filter 40, and an oscillator trap 41 to one of the inputs of another balanced modulator 42. A 250 kilocycle per second oscillator 43 has its output connected to the other input of said balanced modulator 42. The output of balanced modulator 42 is then fed through another oscillator trap 44, a driver amplifier 45, another oscillator trap 46, to a power amplifier 47. Of course, as can be seen, in this particular embodiment, elements 34 through 47 constitute the aforementioned heterodyne dopplerizer 33.

The output of power amplifier 47 also constitutes the output of said heterodyne dopplerizer 33 and it is applied to the input of a projector type transducer which is likewise of the electro-acoustical type which converts an electrical input signal into a proportional acoustical output signal 49 which is broadcast back to the original-searcher 30.

It should be understood that the electronic circuit or circuits of the subject invention as they are portrayed above may be incorporated in any desired container device. A specific example of such container device is shown in patent application Ser. No. 160,374 of Keith E. Geren et al., entitled "Heterodyne Autocorrelation Transponder", filed Dec. 18, 1961, now U.S. Pat. No. 3,171,094. Although eminently suitable as an encasement for the circuitry of this invention, the subject invention is not to be limited thereto because other encasements or housings which may take the form of cans which may be jetisoned through the torpedo tubes of the submarine boat or it may be incorporated in moveable types of devices having appropriate motivation power to provide mobility thereto as desired. Obviously, whether said encasements are stationary in nature or mobile in nature, they are to be sufficiently watertight to prevent the destruction of the contents thereof by the ambient aqueous medium.

Although primarily intended as a dopplerized sonar echo repeater, it would be obvious to one skilled in the art having the benefit of the teachings herein presented to make those design changes that are necessary, as far as structural components and operational frequencies are concerned, to make the subject invention operable and highly effective within other media and for other such purposes as radar, seismographics, of the like.

Briefly, the operation of the subject invention will now be discussed as follows:

In marine warfare tactics, it is recognized that an enemy, having classified a sonar contact as "submarine" and started a sonar attack, is not likely to transfer his efforts to a new target before completing the attack on the original one. However, if said "submarine" employs a suitable decoy before the enemy gains contact, or after contact has been broken, the attention of the enemy vessel may be diverted long enough for the "submarine" to assume the offensive.

For many applications, target simulation need not be an exact facsimile of an actual submarine boat in order to distract the enemy. The most important requirement for a decoy is that it be capable of returning good echoes to the enemy sonar. If an echo has the proper character and produces realistic doppler, most sonar operators will classify the target as an actual submarine boat. The echo repeater constituting the subject invention returns such an echo in that it is for most practical purposes similar in character to echoes returned from an actual submarine boat at beam or quarter aspect. In some instances, of course, a well trained sonar team may classify a decoy as a countermeasure device, but they are almost certain to classify it as either a countermeasure device or an actual submarine. Because an actual submarine has some of the characteristics of a non-submarine target and because a dopplerized echo repeater has practically no non-submarine characteristics, an echo ranging boat or ship that has been on patrol for a considerable length of time would be more likely to classify a dopplerized echo repeater as a submarine boat rather than to classify it as some other target. As a matter of fact, under such circumstances, it would even be more likely to classify the dopplerized echo repeater as a submarine boat than it would be to classify an actual submarine boat as such. Thus, it can readily be seen that incorporation of a dopplerizer within an echo repeater improves the decoying operations thereof considerably, so that the countermeasure effectiveness or the decoy effectiveness is likewise considerably improved.

Figure 5:
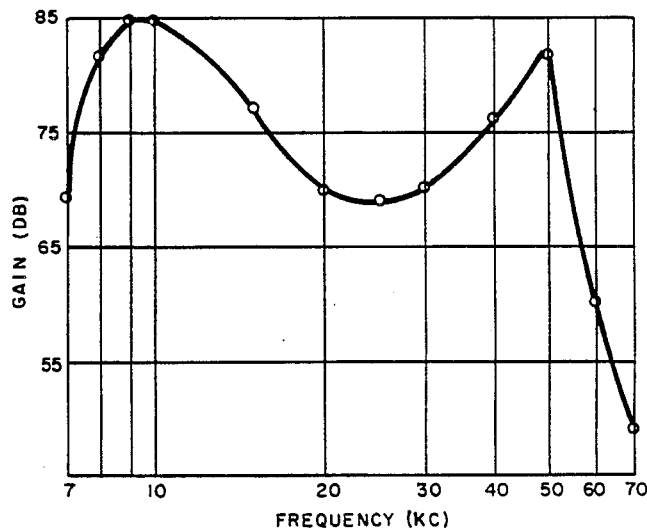
FIG. 5 is a graphical representation of exemplary frequency response characteristics of the device of FIGS. 1 and 2.
Figure 6:
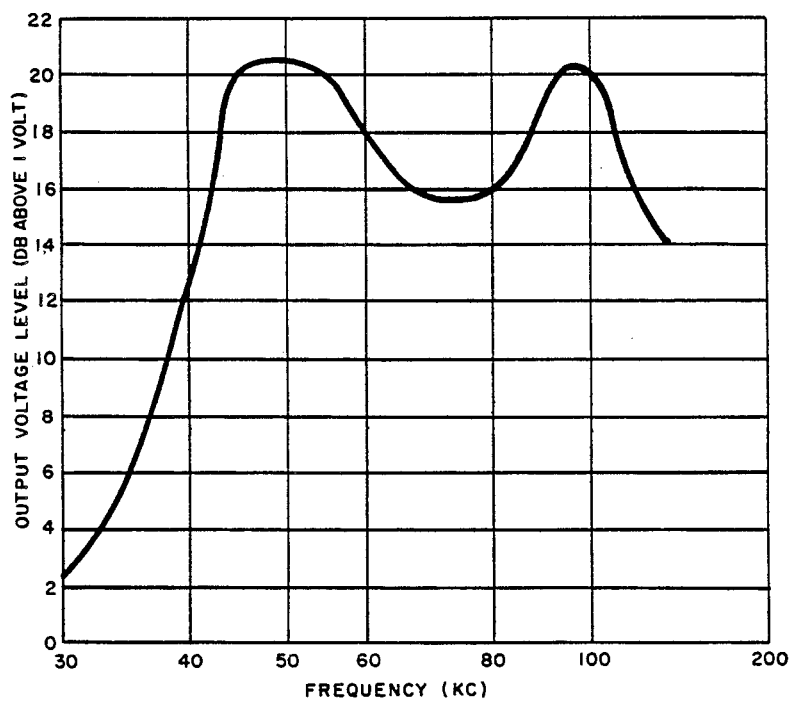
FIG. 6 is a graphical representation of exemplary frequency response characteristics of the device depicted in FIGS. 3 and 4.

The target strength of a good decoy should be equal to that of a submarine but not exceed it if the simulation is to be realistic. To simulate the beam or quarter aspect of a submarine boat target requires a target strength of approximately 25 db, whereas, in this case, target strength is defined as 20 $\log_{10}$ of the ratio of the output of reflected sound pressure from a target, corrected to a range of one meter, to that of the incident sound pressure. This number is also a measure of the acoustic isolation required between the hydrophone and projector in order that suitable acoustic gain or target strength may be obtained without adverse feedback or instability. For purposes of clarity, the curves of FIGS. 5 and 6 respectively show the gain versus frequency which may be expected from the devices of FIGS. 1 and 3. In this particular case, the subject echo repeater has been so designed to provide an up-doppler to indicate or simulate the closing range condition, in order to suggest that the target plans to attack or, at least, that it is not leaving the area. Although many different dopplers may be used due to the fact that so doing would obviously be well within the purview of the skilled artisan, the preferred doppler range should be that which indicates that the target submarine is traveling at speeds from 2 to 12 knots when it is echo ranged upon from the forward quarter.

Hence, for maximum utility the decoy of this invention should have optimum target strength characteristics in combination with the widest band width consistent with compact design and good acoustical performance.

In actual operation, transducer 12 of the device of FIG. 1 receives the enemy sonar ping and after filtering in the 10 to 50 kilocycle per second band-pass filter to eliminate spurious signals, it is amplified and mixed in ring modulator 16 with 185.06 kilocycle per second signal from oscillator 17. The 195 to 235 kilocycle band-pass filter 18 extracts the upper side band therefrom and this is amplified and again filtered in the 195 to 235 kilocycle band-pass filter 20 for spurious signal elimination before being applied through circuit isolation cathode follower 21 to ring modulator 22, where it is again mixed with a 185 kilocycle per second signal from oscillator 23. The output of ring modulator 22 is then amplified and passed through a 50 kilocycle per second low-pass filter which extracts the difference frequency or lower side band therefrom before being power amplified in amplifier 26 and supplied as the input to transducer 27. Making the first oscillator frequency slightly higher (in this exemplary case, 60 cycles per second) than the frequency of the second oscillator produces the desired doppler. Moreover, so doing obviously produces up-doppler; but, of course, if down-doppler is desired, it would only be necessary to make the frequency of the second oscillator slightly greater than that of the first oscillator. In view of this teaching, it would be well within the purview of one skilled in the art to design each of said oscillators and their respective frequencies to produce either up or down doppler in any amounts required for optimum performance during any given operational circumstances.

Transducer 27, of course, broadcasts this signal in acoustical form back to echo-searcher 10. It can, therefore, be seen that the received signal is actually dopplerized by the heterodyne dopplerizer portion of this invention before it is broadcast back to the original echo searcher. Because this dopplerizing actually simulates an up-doppler signal it gives the appearance that the subject echo repeater is traveling toward and perhaps attacking the enemy echo-searching vessel and thereby causing said vessel to take cognizance thereof and waste valuable time and energy dealing with it for its own sake and safety, rather than allocating its combat effort toward other vessels friendly to this decoy.

Figure 2:
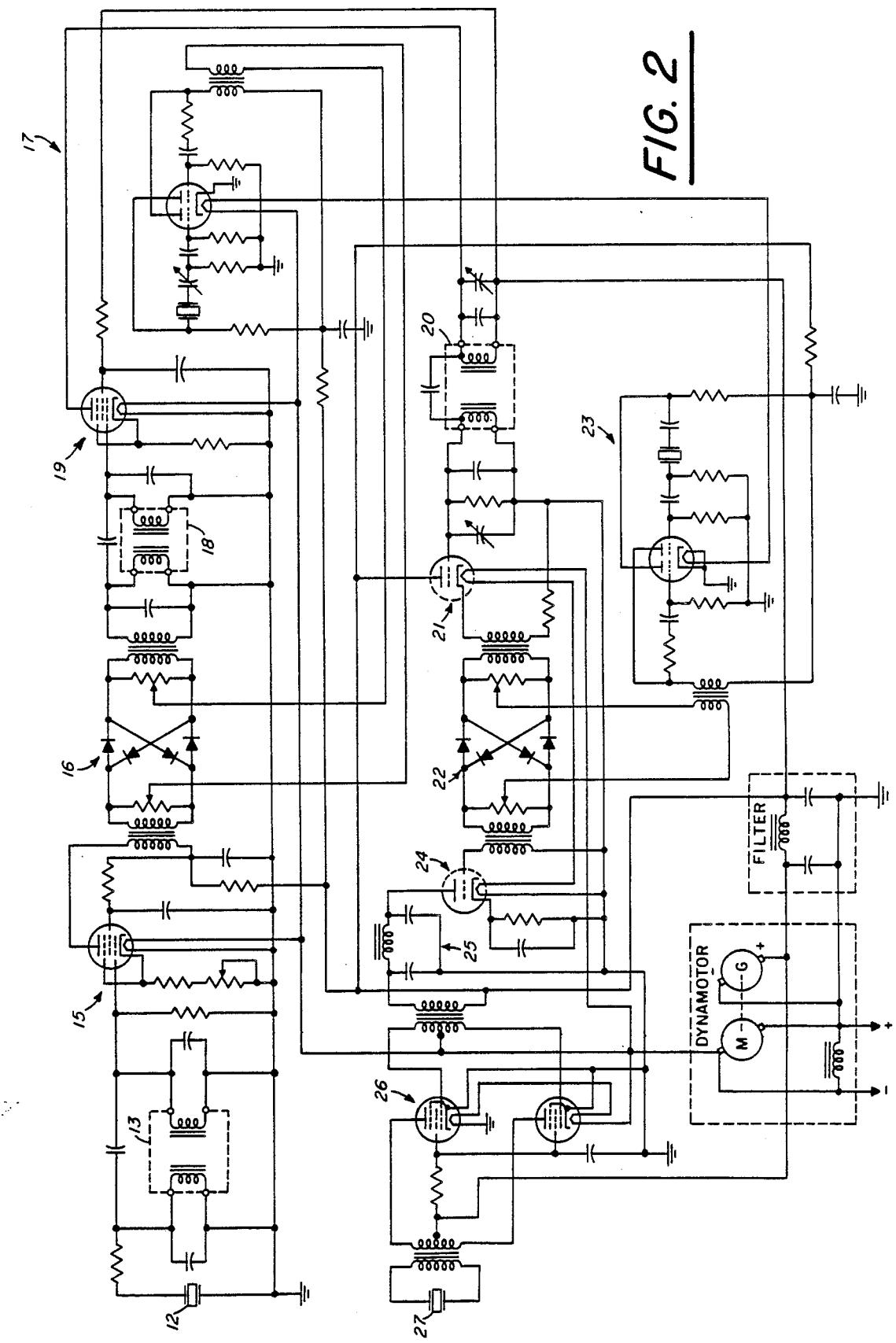
FIG. 2 is a detailed schematic diagram of the device of FIG. 1.
Figure 4:
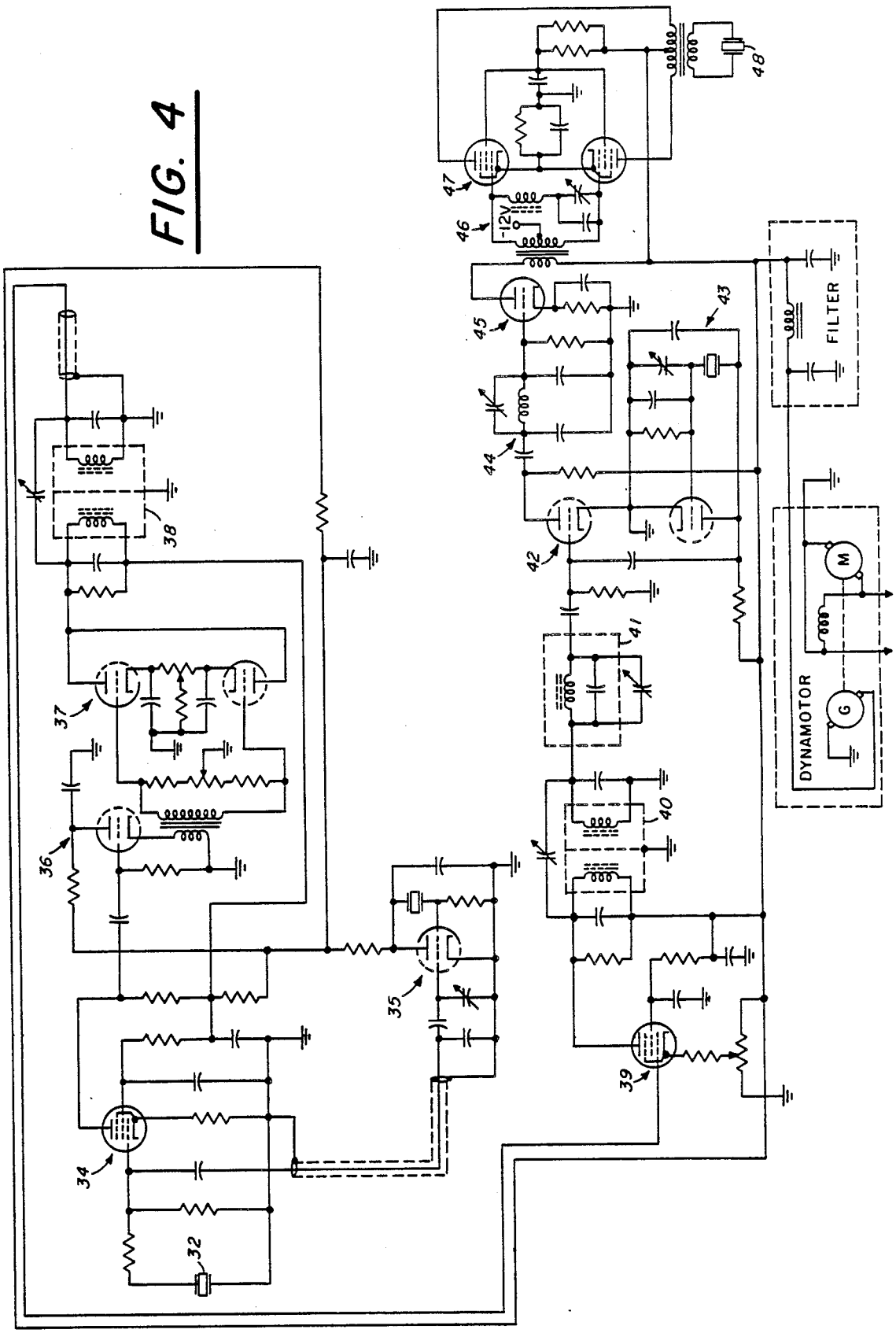
FIG. 4 is a detailed schematic diagram of the device illustrated in FIG. 3.

The device of FIGS. 3 and 4 operate in substantially the same manner as the devices of FIGS. 1 and 2. The sonar signals are received from the echo-searcher 30 by transducer 32. The signal is then mixed in the balanced modulator with the signal from a 250.1 kilocycle per second crystal-controlled oscillator signal. Effectively, the sum frequency is then extracted and mixed with the signal from another crystal oscillator having a frequency of 250 kilocycles per second which is 100 cycles per second lower in frequency than the frequency of the aforesaid balanced modulator input from its respective oscillator. Thus, the resulting difference frequency is about 100 cycles per second higher than the original input signal, and this is the signal which is effectively broadcast back in acoustical form to the original echo-searcher. Again, either up or down doppler may be effected by making the first oscillator frequency slightly higher or lower than the second oscillator frequency, respectively. Furthermore, the appropriate selection of oscillator frequencies may be predetermined by the artisan to effect operational conditions desired. Obviously, this is an abridged description of the operation of this device, but it is believed that it would be obvious to the skilled artisan to recognize that as the received signal is processed as mentioned above it is also appropriately shaped, amplified and filtered in order to eliminate spurious signals and unwanted frequencies.

Although the disclosed embodiments were inherently designed to receive sonar signals within the 50 to 100 kilocycle per second frequency range, it should be obvious that other frequency ranges may also be used if so desired and making the design changes necessary to effect same would be well within the purview of one skilled in the art having the benefit of the teachings herein presented. However, for most practical purposes, the presently disclosed operational band width is eminently satisfactory because it is actually characterized as being a broadband width.

In order to make the operation of the subject invention as nearly perfect as possible under the circumstances, each of the foregoing oscillators are accurately controlled crystal oscillators which produce output frequencies having that degree of accuracy and stability which produce optimum operation within the entire invention.

Obviously, many modifications and variations of the present invention are possible in the light of the above teachings. It is, therefore, to be understood, that within the scope of the appended claims, the invention may be practiced otherwise than as specifically described.

What is claimed is:

1. A broadband dopplerized sonar echo repeater comprising in combination, a first transducer, a first bandpass filter coupled to the output of said first transducer, a first amplifier connected to the output of said first bandpass filter, a first ring modulator having a pair of inputs and an output, with one of the inputs thereof coupled to the output of said first amplifier, a first oscillator coupled to the other input of said first ring modulator, a second bandpass filter coupled to the output of said first ring modulator, a second amplifier connected to the output of said second bandpass filter, a third bandpass filter connected to the output of said second amplifier, a cathode follower coupled to the output of said third bandpass filter, a second ring modulator having a pair of inputs and an output, with one of the inputs thereof connected to the output of said cathode follower, a second oscillator coupled to the other input of said second ring modulator, a driver amplifier connected to the output of said second ring modulator, a low pass filter connected to the output of said driver amplifier, a power amplifier coupled to the output of said low pass filter, and a second transducer connected to the output of said power amplifier.

2. A broadband dopplerized sonar echo repeater consisting of, a hydrophone for receiving acoustical signals within a broad frequency band from within a predetermined subaqueous medium and for converting same into electrical signals proportional thereto, a first bandpass filter coupled to the output of said hydrophone for the passing of electrical signals within a 10 to 50 kilocycle per second frequency band, a first amplifier connected to the output of said first bandpass filter, a first ring modulator having a pair of inputs and an output, with one of the inputs thereof coupled to the output of said first amplifier, a first oscillator coupled to the other input of said first ring modulator for supplying a 185,060 cycle per second electrical signal thereto, a second bandpass filter coupled to the output of said first ring modulator for passing electrical signals within the 195 to 235 kilocycle per second frequency band, a second amplifier connected to the output of said second bandpass filter, a third bandpass filter connected to the output of said second amplifier for passing electrical signals within a 195 to 235 kilocycle per second frequency band, a circuit isolation cathode follower coupled to the output of said third bandpass filter, a second ring modulator having a pair of inputs and an output, with one of the inputs thereof connected to the output of said circuit isolation cathode follower, a second oscillator coupled to the other input of said second ring modulator for supplying a 185 kilocycle per second electrical signal thereto, a driver amplifier connected to the output of said second ring modulator, a low pass filter connected to the output of said driver amplifier for passing electrical signals within a 10 to 50 kilocycle per second frequency band, a power amplifier coupled to the output of said low pass filter, and a projector transducer connected to the output of said power amplifier for converting the electrical signals received therefrom into acoustical signals proportional thereto and for broadcasting same throughout the aforesaid subaqueous medium.

3. A broadband dopplerized sonar echo repeater comprising in combination, a first transducer, a first balanced modulator effectively coupled to the output of said first transducer, a first oscillator effectively connected to the output of said first transducer and an input of said first balanced modulator, a bandpass filter coupled to the output of said first balanced modulator, a first oscillator trap coupled to the output of said bandpass filter, a second balanced modulator having a pair of inputs and an output, with one of the inputs thereof coupled to the output of said first oscillator trap, a second oscillator connected to the other input of said second balanced modulator, a second oscillator trap coupled to the output of said second balanced modulator, a driver amplifier coupled to the output of said second oscillator trap, a power amplifier effectively coupled to the output of said driver amplifier, and a second transducer connected to the output of said power amplifier.

* * * * *